(12) United States Patent
Bacastow

(10) Patent No.: US 8,490,870 B2
(45) Date of Patent: Jul. 23, 2013

(54) APPARATUS AND METHOD FOR POS PROCESSING

(75) Inventor: Steven V. Bacastow, Cumming, GA (US)

(73) Assignee: Six Circle Limited Liability Company, Wilmington, DE (US)

( * ) Notice: Subject to any disclaimer, the term of this patent is extended or adjusted under 35 U.S.C. 154(b) by 115 days.

(21) Appl. No.: 12/906,375

(22) Filed: Oct. 18, 2010

(65) Prior Publication Data

US 2011/0040641 A1 Feb. 17, 2011

Related U.S. Application Data

(63) Continuation of application No. 12/283,644, filed on Sep. 15, 2008, now Pat. No. 7,841,534, which is a continuation of application No. 11/141,837, filed on Jun. 1, 2005, now Pat. No. 7,464,862.

(60) Provisional application No. 60/579,997, filed on Jun. 15, 2004, provisional application No. 60/631,300, filed on Nov. 24, 2004.

(51) Int. Cl.
*G06K 5/00* (2006.01)

(52) U.S. Cl.
USPC .............. 235/380; 235/383; 705/16; 705/21; 705/26.1

(58) Field of Classification Search
USPC .............. 235/380, 383; 705/16, 21, 26.1
See application file for complete search history.

(56) References Cited

U.S. PATENT DOCUMENTS

| | | | |
|---|---|---|---|
| 5,331,136 A | 7/1994 | Koench et al. | |
| 5,566,339 A | 10/1996 | Perholtz et al. | |
| 5,590,038 A | 12/1996 | Pitroda | |
| 5,592,618 A | 1/1997 | Micka et al. | |
| 5,696,909 A | 12/1997 | Wallner | |
| 5,790,074 A | 8/1998 | Rangedahl et al. | |
| 5,844,776 A | 12/1998 | Yamaguchi et al. | |
| 5,884,271 A | 3/1999 | Pitroda | |
| 5,956,733 A | 9/1999 | Nakano et al. | |
| 5,979,753 A | 11/1999 | Rosia | |
| 6,003,008 A | 12/1999 | Postrel et al. | |
| 6,062,478 A | 5/2000 | Izaguirre et al. | |
| 6,166,688 A | 12/2000 | Cromer et al. | |
| 6,442,682 B1 | 8/2002 | Pothapragada et al. | |
| 6,546,441 B1 | 4/2003 | Lum | |
| 6,553,348 B1 | 4/2003 | Hashimoto | |
| 6,574,716 B2 | 6/2003 | Dovi | |
| 6,614,349 B1 | 9/2003 | Proctor et al. | |
| 6,640,217 B1 | 10/2003 | Scanlan et al. | |

(Continued)

FOREIGN PATENT DOCUMENTS

WO 03009620 1/2003

OTHER PUBLICATIONS

Gamble, Richard H., PINning Hopes on e-Commerce Debit, Transaction Trends, Nov. 2010, pp. 18-20.

(Continued)

*Primary Examiner* — Allyson Trail

(74) *Attorney, Agent, or Firm* — Stolowitz Ford Cowger LLP

(57) ABSTRACT

An apparatus and method for configuring, altering, controlling, securing, and extending the processing capability and functionality of PCs and POS devices using a non-volatile memory device using software and data carried within the apparatus.

23 Claims, 2 Drawing Sheets

U.S. PATENT DOCUMENTS

| | | | |
|---|---|---|---|
| 6,704,885 B1 | 3/2004 | Salas-Meza et al. | |
| 6,925,439 B1 | 8/2005 | Pitroda | |
| 6,950,949 B1 | 9/2005 | Gilchrist | |
| 7,103,684 B2 | 9/2006 | Chen et al. | |
| 7,143,289 B2 | 11/2006 | Denning et al. | |
| 7,165,154 B2 | 1/2007 | Coombs et al. | |
| 7,225,208 B2 | 5/2007 | Midgley et al. | |
| 7,229,016 B2 | 6/2007 | Bravo | |
| 7,263,190 B1 | 8/2007 | Moritz | |
| 7,269,732 B2 | 9/2007 | Kilian-Kehr | |
| 7,308,426 B1 | 12/2007 | Pitroda | |
| 7,349,871 B2 | 3/2008 | Labrou | |
| 7,353,382 B2 | 4/2008 | Labrou | |
| 7,356,510 B2 | 4/2008 | Durand et al. | |
| 7,356,703 B2 | 4/2008 | Chebolu et al. | |
| 7,403,743 B2 | 7/2008 | Welch | |
| 7,404,088 B2 | 7/2008 | Giobbi | |
| 7,421,516 B2 | 9/2008 | Minogue et al. | |
| 7,464,862 B2 | 12/2008 | Bacastow | |
| 7,552,094 B2 | 6/2009 | Park et al. | |
| 7,561,691 B2 | 7/2009 | Blight et al. | |
| 7,574,220 B2 | 8/2009 | Purkayastha et al. | |
| 7,606,560 B2 | 10/2009 | Labrou | |
| 7,706,369 B2 | 4/2010 | Roese et al. | |
| 7,739,402 B2 | 6/2010 | Roese et al. | |
| 7,801,826 B2 | 9/2010 | Labrou | |
| 7,822,688 B2 | 10/2010 | Labrou | |
| 7,841,534 B2 | 11/2010 | Bacastow | |
| 8,011,013 B2 | 8/2011 | Bacastow | |
| 8,037,304 B2 | 10/2011 | Rensin et al. | |
| 8,041,947 B2 | 10/2011 | O'Brien et al. | |
| 2002/0082925 A1 | 6/2002 | Herwig | |
| 2002/0188856 A1 | 12/2002 | Worby | |
| 2002/0193157 A1 | 12/2002 | Yamada | |
| 2003/0005193 A1 | 1/2003 | Seroussi et al. | |
| 2003/0046034 A1 | 3/2003 | Kitamoto et al. | |
| 2003/0050940 A1 | 3/2003 | Robinson | |
| 2003/0055792 A1 | 3/2003 | Kinoshita et al. | |
| 2003/0074575 A1 | 4/2003 | Hoberock et al. | |
| 2003/0110371 A1 | 6/2003 | Yang et al. | |
| 2003/0115126 A1 | 6/2003 | Pitroda | |
| 2003/0135418 A1 | 7/2003 | Shekhar et al. | |
| 2003/0174167 A1 | 9/2003 | Poo | |
| 2003/0225971 A1 | 12/2003 | Oishi et al. | |
| 2003/0233501 A1 | 12/2003 | Ma et al. | |
| 2003/0236872 A1* | 12/2003 | Atkinson | 709/223 |
| 2004/0001088 A1 | 1/2004 | Stancil et al. | |
| 2004/0019742 A1 | 1/2004 | Wei et al. | |
| 2004/0038592 A1 | 2/2004 | Yang | |
| 2004/0039575 A1 | 2/2004 | Bum | |
| 2004/0039851 A1 | 2/2004 | Tang et al. | |
| 2004/0039854 A1 | 2/2004 | Estakhri et al. | |
| 2004/0095382 A1 | 5/2004 | Fisher et al. | |
| 2004/0107170 A1 | 6/2004 | Labrou | |
| 2004/0158499 A1 | 8/2004 | Dev | |
| 2005/0010768 A1 | 1/2005 | Light et al. | |
| 2005/0010835 A1 | 1/2005 | Childs et al. | |
| 2005/0081198 A1 | 4/2005 | Cho et al. | |
| 2005/0125513 A1 | 6/2005 | Lam et al. | |
| 2005/0138390 A1 | 6/2005 | Adams et al. | |
| 2005/0144443 A1 | 6/2005 | Cromer et al. | |
| 2005/0149394 A1 | 7/2005 | Postrel | |
| 2005/0149684 A1 | 7/2005 | Sankaran et al. | |
| 2005/0149745 A1 | 7/2005 | Ishidoshiro | |
| 2005/0216466 A1 | 9/2005 | Miyamoto et al. | |
| 2005/0247777 A1 | 11/2005 | Pitroda | |
| 2006/0010325 A1 | 1/2006 | Liu et al. | |
| 2006/0041934 A1 | 2/2006 | Hetzler | |
| 2006/0206720 A1 | 9/2006 | Harada et al. | |
| 2006/0209337 A1 | 9/2006 | Atobe et al. | |
| 2006/0253620 A1 | 11/2006 | Kang | |
| 2007/0022058 A1 | 1/2007 | Labrou | |
| 2007/0055635 A1 | 3/2007 | Kanapur | |
| 2007/0081508 A1 | 4/2007 | Madhavan et al. | |
| 2007/0124211 A1* | 5/2007 | Smith | 705/21 |
| 2007/0143529 A1 | 6/2007 | Bacastow | |
| 2007/0198432 A1 | 8/2007 | Pitroda | |
| 2007/0214047 A1 | 9/2007 | Antonello | |
| 2007/0245158 A1 | 10/2007 | Giobbi et al. | |
| 2008/0005426 A1 | 1/2008 | Bacastow et al. | |
| 2008/0022003 A1 | 1/2008 | Alve | |
| 2008/0081608 A1 | 4/2008 | Findikli et al. | |
| 2008/0114659 A1 | 5/2008 | Pitroda | |
| 2008/0177826 A1 | 7/2008 | Pitroda | |
| 2008/0227391 A1 | 9/2008 | Rosenberg | |
| 2009/0010503 A1 | 1/2009 | Mathiassen et al. | |
| 2011/0071949 A1 | 3/2011 | Petrov | |
| 2011/0231274 A1* | 9/2011 | Joao | 705/26.1 |

OTHER PUBLICATIONS

Iomega Automatic Backup Manual Table of Contents (hereafter "IAB" archived on Dec. 22, 2002 at: http://web.archive.org/web/20021222172018/http://www.iomega.com/support/manuals/ioauto/main.html (linking to 22 pages—hereafter "IAB1" . . . "IAB22").

http://web.archive.org/web/20021030183837/www.iomega.com/support/manuals/ioauto/qs_setup.html (hereafter "IAB1") (archived on Oct. 10, 2002).

http://web.archive.org/web/20021223082620/www.iomega.com/support/manuals/ioauto/qs_schedule.html (hereafter "IAB11") (archived on Dec. 23, 2002).

http://web.archive.org/web/20021223081144/www.iomega.com/support/manuals/ioauto/qs_cache.html (hereafter "IAB12") (archived on Dec. 23, 2002).

http://web.archive.org/web/20021223075646/www.iomega.com/support/manuals/ioauto/qs_nomonitor.html (hereafter "IAB13") (archived on Dec. 23, 2002).

http://web.archive.org/web/20021223081714/http://www.iomega.com/support/manuals/ioauto/qs_restore.html (hereafter "IAB15") (archived on Dec. 23, 2002).

Stolowitz Ford Cowger LLP, Listing of Related Cases, Dec. 7, 2011.

* cited by examiner

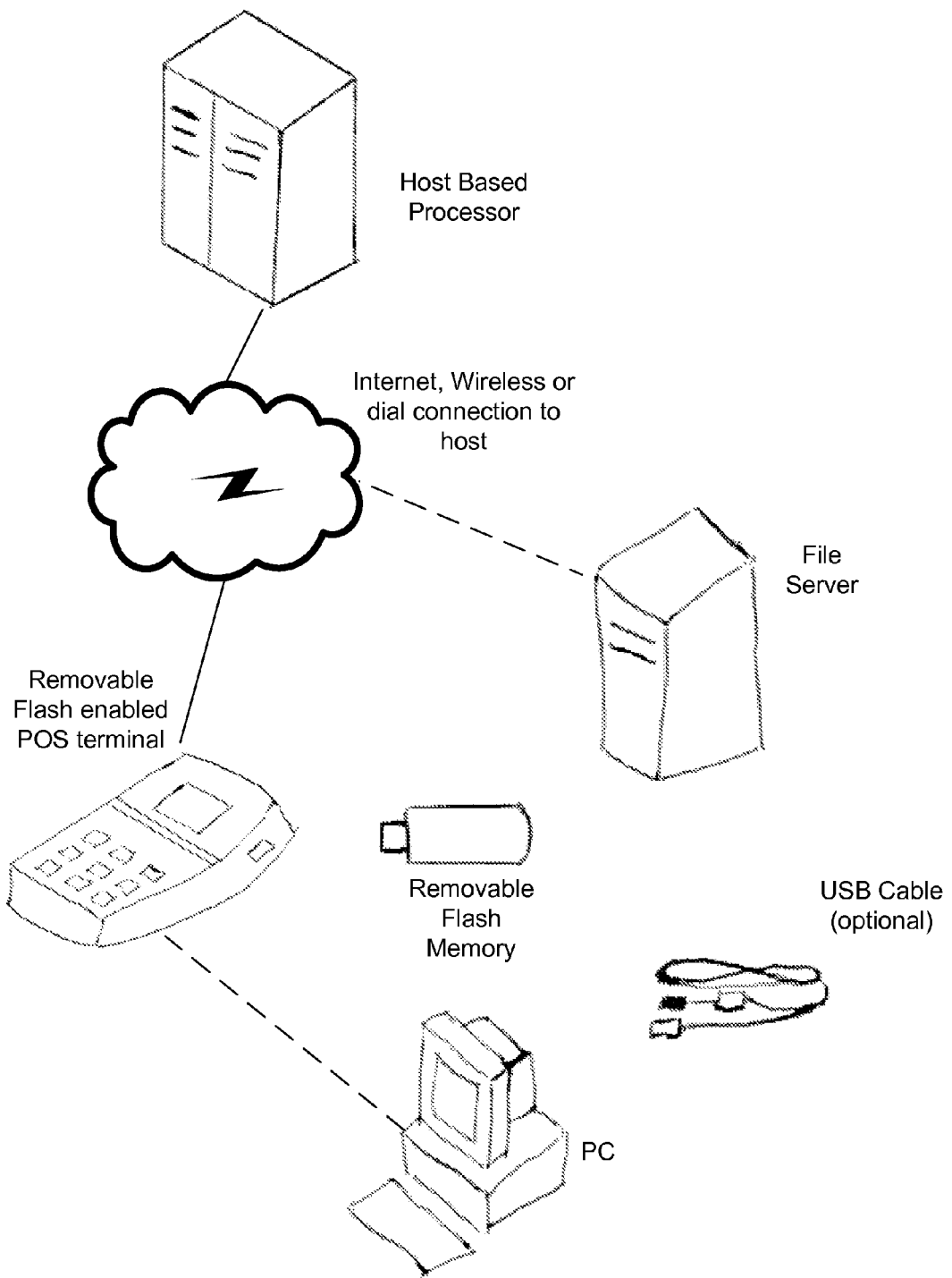
Figure 1 – Component List

Figure 2 – Basic Configuration
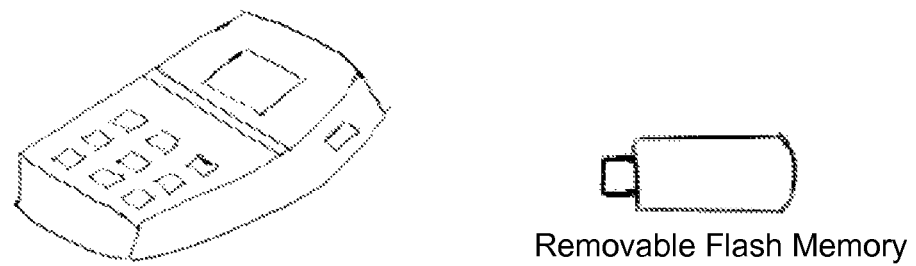
Removable Flash enabled POS terminal
Removable Flash Memory

APPARATUS AND METHOD FOR POS PROCESSING

RELATED APPLICATION

This application is a continuation of and claims priority to U.S. patent application Ser. No. 12/283,644, filed Sep. 15, 2008, and entitled "Apparatus and Method for POS Processing", which issued Nov. 30, 2010 as U.S. Pat. No. 7,841,534 and which is a continuation of and claims priority to U.S. application Ser. No. 11/141,837, filed Jun. 1, 2005, and entitled "Apparatus and Method for POS Processing", which issued Dec. 16, 2008 as U.S. Pat. No. 7,464,862 and which claims priority to U.S. Provisional Patent Application Ser. Nos. 60/579,997 filed Jun. 15, 2004 and 60/631,300 filed Nov. 24, 2004. The content of all of these prior applications is hereby fully incorporated herein by reference.

COPYRIGHT NOTICE

A portion of the disclosure of this patent document may contain material, which is subject to copyright protection. The copyright owner has no objection to the facsimile reproduction by anyone of the patent document or patent disclosure as it appears in the U.S. Patent and Trademark Office patent file or records, but otherwise reserves all copyright rights whatsoever.

FIELD OF THE INVENTION

The present invention relates to an apparatus and method for enhancing the functionality and security of point-of-sale terminals through the use of a portable non-volatile memory device using software and data carried within the device.

BACKGROUND OF THE INVENTION

In recent years, point-of-sale (POS) terminals and the software that supports POS business applications have become increasingly complex. New 'modular' applications have been developed to capitalize on the new POS terminal capabilities and serve to increase the utility value of the point-of-sale terminal. Concurrently, the internet has provided an opportunity to increase the communication bandwidth to the POS terminals, again increasing the type of functionality and transactions that can be supported. However, the POS terminals themselves lack the capacity to store large amounts of data and the business applications available to POS terminals are therefore limited.

The number of merchants, terminals and transactions is increasing annually. Along with these increases, there has been an increase in fraud at the point-of-sale. Current methods fail to adequately prevent consumer and merchant fraud from occurring at the point-of-sale. Authenticating transactions originating from POS devices using secure tokens, digital certificates and other unique merchant identifiers used to control or limit individual user access and functionality are not easily supported by conventional methods.

Also, the process of configuring the POS terminal to function in accordance with the merchant's needs and approved transactions is becoming increasingly complex and time consuming. One drawback to conventional methods for configuring POS devices is related to the current method of downloading the POS business application programs (eg. restaurant, retail, lodging, mail order, petroleum) and the merchant-specific configuration attributes (eg. Bar-tabs, tips, merchant-id, terminal-id, American Express SE number). Current methods rely on transferring (i.e. downloading) this information over dial or high-speed connections with a host-based system. The process is very time consuming, error prone and therefore expensive.

Another drawback to conventional methods for introducing new products to the market is related to the fact that the POS business applications must first be certified by the credit card processors (such as Vital Processing, Nova Information Systems, Global Payments, RBS Lynk, First Data) in advance of commercial use. Certification must be completed separately by each processor for each type of POS terminal and business application prior to the device being approved for sale and support (as a 'Class-A' product). This certification process is generally manual in nature, time consuming and expensive and often requires 6 to 12 months per each business application. Any single change such as a line of source code (or for example an additional module added) to a business application requires that the certification process start over again. POS terminal manufacturers (i.e. Verifone, Hypercom, Ingenico, others) are therefore constrained in their ability to sell and distribute new POS terminal models until the business applications are certified (and therefore supported) by the major processors. This scenario creates friction in the distribution channel as the manufacturers seek to gain market share with new innovative equipment because it requires them to wait for each of the major processors (i.e. First Data, Vital Processing, Global Payments, Nova Information Systems, RBS Lynk, others) to first certify the business applications.

Finally, because of the high cost of the device and the security requirements, the POS terminal industry is generally constrained to sell terminals and software only for use by approved merchants and they do not typically sell terminals directly to consumers for use at the home or office.

The price of non-volatile (flash) memory is rapidly decreasing while the capacity and available is increasing. The next generation of POS devices will support non-volatile, detachable flash memory from serial, USB, and other methods. In fact, POS manufacturers are in the very beginning stages of supporting USB devices on POS terminals and there are no commercial uses of this technology today on POS devices. Computer programs (i.e. Business Applications) can and should be developed to enhance the utility value, functionality and security of these next generation POS devices. It will be difficult for the industry to embrace this new technology using current methods.

Therefore, a need exists for an apparatus and method that addresses these shortcomings in the prior art by utilizing the new capabilities provided through non-volatile, removable flash memory.

SUMMARY OF THE INVENTION

The present invention answers these needs by providing an apparatus and method for configuring, altering, controlling, securing, and extending the processing capability and functionality of POS devices using a non-volatile memory device using software and data carried within the device.

According to the present invention design, a portable housing is provided with non-volatile memory inside. An interface is provided on the housing for communication between the non-volatile memory and the Removable Flash Enabled POS Device. Business software applications and configuration data are loaded into the non-volatile memory. The software applications can be loaded into the non-volatile memory by the POS terminal manufacturer, the Independent Sales Organization (ISO), by a payment processing company, or by the Merchant via a CD-ROM, the Internet, or other suitable means.

Because the software 'business applications' and configuration data 'merchant specific attributes' reside (either fully or partially) on the removable storage device (non-volatile memory) and not on fully on the POS terminal (current industry standard), the present invention may be used to configure and inter-operate with multiple POS devices.

It is thus an advantage of the present invention to provide an apparatus and method for quickly configuring, enhancing, controlling, securing, or extending the functionality of a Removable Flash Enabled POS Device without time-consuming and expensive software modifications or host-based download processes. To this end, the present invention is highly portable, operates independently of any particular POS terminal, and is compatible with a wide variety of POS terminal devices.

Embodiments of the present invention are described below by way of illustration. Other approaches to implementing the present invention and variations of the described embodiments may be constructed by a skilled practitioner and are considered within the scope of the present invention.

BRIEF DESCRIPTION OF THE DRAWINGS

FIG. 1 is an overview of the primary components which would be required to support all of the invention embodiments. Components include: (1) Removable-Flash Enabled POS Device; (2) Removable Flash Memory; (3) Dial-up, Wireless, or High-speed internet connection to Host Processor; (4) Host Processor; (5) Cable; (6) File Server; (7) Personal Computer.

FIG. 2 is an overview of the basic required components which would be required to support a limited set of the invention embodiments. Components include: (1) Removable Flash Enabled POS Device; (2) Removable Flash Memory.

DETAILED DESCRIPTION OF THE INVENTION

An embodiment of the invention allows for the secure storage of any persistent data (data of a permanent nature until changed or deleted) onto [FIG. 1: Removable Flash Memory]. This persistent data may be related to POS terminal configuration and, or transaction data. This data volume currently exceeds the storage capacity of the POS device [FIG. 1: Removable Flash Enabled POS Device] and therefore limits the utility value and overall functionality of the device to the merchant.

An embodiment of the invention allows for the tracking of cardholder and related customer transaction activity on the [FIG. 2: Removable Flash Memory] for the purpose of gift and loyalty program tracking without the need for an online, host-based connection.

An embodiment of the invention allows for the storage of known lost, stolen or fraudulent credit card and debit card numbers on the [FIG. 2: Removable Flash Memory], to prevent the use of these cards for POS transactions without the need for a host-based online connection (or in an offline mode). In connection with this embodiment, merchant-specific, employee-specific or location-specific fraud rules and limits may be defined and enforced without the need for an online connection to a host.

An embodiment of the invention allows for the immediate configuration of a new or re-configuration of a POS terminal device shown in [FIG. 2—Removable Flash Enabled POS Device] using data and programs stored on the [FIG. 2: Removable Flash Memory] without the need to dial, download or connect the POS terminal with a central, host-based configuration process.

An embodiment of the invention allows for the storage of daily transaction totals on the [FIG. 1: Removable Flash Memory] for internal control, balancing, and reconcilement purposes using the [FIG. 1: PC or FIG. 1: File Server].

An embodiment of the invention allows for the secure storage of daily transactions (or batches of transactions) on the [FIG. 1: Removable Flash Memory] for the subsequent submission or 'uploading' to a host-based authorization system [FIG. 1: Host] and, or a local PC-based reporting process as shown in [FIG. 1: Personal Computer] or [FIG. 1: File Server].

An embodiment of the invention allows for the creation of authorized users and passwords for the merchant-specific POS device and would therefore require the [FIG. 1: Removable Flash Memory] to be connected to the POS device [FIG. 1: Removable Flash Enabled POS Device] prior to use and during use. This embodiment will also serve to control the functionality of the device [FIG. 1: Removable Flash Enabled POS Device] for specific users and therefore act as a 'key' to this POS device.

An embodiment of the invention allows for protection of files and data stored on the POS device [FIG. 1: Removable Flash Enabled POS Device] or the removable storage device [FIG. 1: Removable Flash Memory] through the use of an encryption method which is compliant with current payment industry security standards set by Visa (i.e. CISP), MasterCard, and American Express.

An embodiment of the invention allows for the merchant-specific configuration of a POS device [FIG. 1: Removable Flash Enabled POS Device] to be backed up onto [FIG. 1: Removable Flash Memory] and restored onto another identical POS device.

An embodiment of the invention allows for an independent audit or sampling of POS transactions from [FIG. 1: Removable Flash Enabled POS Device] onto [FIG. 1: Removable Flash Memory] for use by internal or external auditors as part of Sarbanes Oxley or related internal control requirements.

An embodiment of the invention provides a mechanism for capturing signatures and receipts from the POS device [FIG. 1: Removable Flash Enabled POS Device] onto [FIG. 1: Removable Flash Memory] which can be later transferred to [FIG. 1: Personal Computer] or [FIG. 1: File Server] and used for customer service, charge-back research and other related value-add purposes.

An embodiment of the invention provides a mechanism for capturing check images and check data from [FIG. 1: Removable Flash Enabled POS Device] and storing this information onto [FIG. 1: Removable Flash Memory] formatted in compliance with Check21 and, or NACHA's ARC requirements. This data can subsequently be transferred to [FIG. Personal Computer] or [FIG. 1: File Server] or [FIG. 1: Host] and used for financial transaction fulfillment, clearing other related purposes.

An embodiment of the invention provides a mechanism for storing and retrieving HTML and similar presentation content on the [FIG. 1: Removable Flash Memory] as required to format screens on [FIG. 1: Removable Flash Enabled POS Device].

An embodiment of the invention provides a means to store onto the [FIG. 1: Removable Flash Memory] and display marketing presentations such as flash or video presentations on the screen of the POS device [FIG. 1: Removable Flash Enabled POS Device].

An embodiment of the invention provides a means to conduct customer surveys on [FIG. 1: Removable Flash Enabled POS Device] and collect and store survey results on [FIG. 1: Removable Flash Memory]. This data can subsequently be transferred to [FIG. 1: Personal Computer] or [FIG. 1: File Server] or [FIG. 1: Host] and used for customer service other related purposes.

An embodiment of the invention provides a means of storing product catalogs, inventory levels and pricing on [FIG. 1: Removable Flash Memory] or [FIG. 2: Removable Flash Memory] to allow customers to shop at the POS terminal [FIG. 2: Removable Flash Enabled POS Device] while in an offline mode. This inventory data can subsequently be transferred to [FIG. 1: Personal Computer] or [FIG. 1: File Server] or [FIG. 1: Host] and used for updating central inventory, re-order and other related purposes.

An embodiment of the invention allows for local "stand-in" processing using data, logic and rules contained within the [FIG. 2: Removable Flash Memory] to authorize transactions when the host is down in lieu of (or in addition to) traditional voice authorizations. In connection with this embodiment, the locally authorized transactions would be uploaded to the host [FIG. 1: Host Processor] automatically whenever the online connection is restored.

An embodiment of the present invention provides a means of storing onto [FIG. 1: Removable Flash Memory] and dispensing coupons from [FIG. 1: Removable Flash Enabled POS Device] to customers in order to encourage repeat sales and to calculate discounts on sale items for qualifying customers.

An embodiment of the invention allows for music and games to be stored on to [FIG. 1: Removable Flash Memory] and played through the POS device [FIG. 1: Removable Flash Enabled POS Device].

An embodiment of the invention allows for the configuration of a virtual private network (VPN) or similar secure network over the [FIG. 1: Dial-up, Wireless or High-speed Internet connection to Host] to facilitate authentication to the network's processor [FIG. 1: Host Processor]. This embodiment also supports other advanced security mechanisms which otherwise would not be supportable by the POS device. In connection with this embodiment, a secure token, digital certificate, encryption key or other unique identifier is permanently stored on the non-volatile memory device [FIG. 1: Removable Flash Memory] and released to the payment network to authenticate each session and, or transaction.

An embodiment of the invention facilitates the transfer (such as downloading from the internet or a wireless network) of large files (such as but not limited to: inventory levels, pricing, negative card files, bin tables, music, games, marketing presentations, etc.) through the connection POS device [FIG. 1: Removable Flash Enabled POS Device] over high-speed connections [FIG. 1: Dial-up, Wireless, or High-speed internet connection to Host Processor] and stored directly onto [FIG. 1: Removable Flash Memory].

An embodiment of the current invention would allow the POS device to route payment or non-payment transactions based on bin tables (and related rules) that are stored on the removable device. In connection with this embodiment, these bin tables would be updated periodically thought a connection such as [FIG. 1: Dial-up, Wireless, or High-speed internet connection to Host Processor] or via CD ROM.

An embodiment of the invention integrates a Personal Computer with a POS device for merchant or home users. Connectivity would be provided to the non-volatile flash memory [FIG. 1: Removable Flash Memory] to create an interoperable application that fully leverages the capabilities of the PC [FIG. 1: PC]. In connection with this embodiment, a merchant or consumer will be able to initiate a card-centric (swipe and signature for pin-based) financial transaction from their home or business using the [FIG. 1: Removable Flash Memory] and without the need for a separate POS device. This embodiment also creates a potentially huge new market for accepting secure payment transactions from millions of existing and future PCs.

An embodiment of the invention would allow consumer credit card, pre-paid card, gift card, and other related personal account information to be securely stored on a consumer's personal non-volatile memory device (such as a USB flash memory device) [FIG. 1: Removable USB Flash Memory] and accessed by the POS terminal [FIG. 1: Removable Flash Enabled POS Device] when inserted into the POS terminal or via RFID. This embodiment would therefore replace the need for the consumer to provide a magnetic-stripe, smart-card or other card-centric payment device.

Having thus described the invention in detail, it should be apparent that various modifications and changes may be made without departing from the spirit and scope of the present invention. Consequently, these and other modifications are contemplated to be within the spirit and scope of the following claims.

I claim:

1. An apparatus, comprising:
   a portable housing;
   a non-volatile memory within the housing; and
   an interface on the portable housing for communication between the non-volatile memory and a point-of-sale device;
   wherein the non-volatile memory includes instructions stored thereon that, in response to execution by a processing device, cause the processing device to perform operations comprising:
   supporting the point-of-sale device in processing a transaction;
   downloading a merchant-specific configuration from the point-of-sale device; and
   restoring the merchant-specific configuration onto another point-of-sale device.

2. The apparatus of claim 1, wherein the portable housing comprises at least one of a mobile telephone housing, a personal digital assistant housing, and a USB flash memory device housing.

3. The apparatus of claim 1, wherein the operations further comprise:
   upon the availability of a network connection, instructing the point-of-sale device to transmit a record of the transaction via the network connection to a remote server computer.

4. The apparatus of claim 1, wherein processing the transaction comprises charging an account.

5. The apparatus of claim 1, wherein the operations further comprise transmitting to the point-of-sale device at least one of coupon data or product inventory data.

6. The apparatus of claim 1, wherein the operations further comprise supporting the point-of-sale device in processing the transaction without the processing requiring a network connection between the point-of-sale device and a remote server computer during the transaction.

7. The apparatus of claim 1, wherein the operations further comprise functioning as a key to unlock the point-of-sale device when connected and lock the point-of-sale device when unconnected.

8. A method, comprising:
electronically coupling a portable memory device to a point-of-sale device, wherein responsive to the coupling the point-of-sale device operates as a host to the portable memory device and the portable memory device operates as a peripheral of the host; and
responsive to the coupling, supporting the point-of-sale device in processing a transaction;
wherein supporting the point-of-sale device in processing the transaction further comprises:
receiving, at the portable memory device from the point-of-sale device, a request for an account identifier, the request associated with the transaction;
retrieving, by the portable memory device, the account identifier for use with the transaction from a non-volatile memory of the portable memory device;
transmitting, by the portable memory device to the point-of-sale device, the account identifier for use with the transaction; and
receiving, at the portable memory device, a confirmation that the transaction has been completed.

9. The method of claim 8, further comprising, upon the availability of a network connection, transmitting a record of the transaction via the network connection to a remote server computer.

10. The method of claim 8, wherein the portable memory device comprises at least one of a mobile telephone or a personal digital assistant.

11. The method of claim 8, wherein the confirmation is received at the portable memory device from at least one of the point-of-sale device or a remote server computer.

12. The method of claim 8, wherein the account identifier is associated with at least one of a credit card account, a debit card account, or a gift card account.

13. The method of claim 8, further comprising:
transmitting, by the portable memory device to the point-of-sale device, at least one of coupon data or product inventory data.

14. The method of claim 8, further comprising:
downloading a merchant-specific configuration from the point-of-sale device; and
restoring the merchant-specific configuration onto another point-of-sale device.

15. An apparatus, comprising:
means for persistently storing data;
means for removably attaching a data interface of the persistent storage means to a data interface of a point-of-sale device, wherein the data interface of the persistent storage means comprises a Universal Serial Bus (USB) interface;
means for determining whether the point-of-sale device is processing a transaction; and
means for supporting the point-of-sale device in processing the transaction using communications transmitted over the data interfaces.

16. The apparatus of claim 15, wherein processing the transaction includes charging an account.

17. The apparatus of claim 15, further comprising:
means for downloading a merchant-specific configuration from the point-of-sale device; and
means for restoring the merchant-specific configuration onto another point-of-sale device.

18. An apparatus, comprising:
a portable housing;
an electronic device comprising a non-volatile memory within the portable housing; and
an interface on the portable housing for communication between the non-volatile memory and a point-of-sale device;
wherein the non-volatile memory includes instructions stored thereon that, in response to execution by a processing device, cause the processing device to perform operations comprising:
electronically coupling the interface to the point-of-sale device, wherein responsive to the coupling the point-of-sale device operates as a host to the electronic device and the electronic device operates as a peripheral of the host; and
responsive to the coupling, supporting the point-of-sale device in processing a transaction.

19. The apparatus of claim 18, wherein the portable housing comprises at least one of a mobile telephone housing, a personal digital assistant housing, and a USB flash memory device housing.

20. The apparatus of claim 18, wherein the operations further comprise:
upon the availability of a network connection, instructing the point-of-sale device to transmit a record of the transaction via the network connection to a remote server computer.

21. The apparatus of claim 18, wherein processing the transaction comprises charging an account.

22. The apparatus of claim 18, wherein the operations further comprise transmitting to the point-of-sale device at least one of coupon data or product inventory data.

23. The apparatus of claim 18, wherein the operations further comprise supporting the point-of-sale device in processing the transaction without the processing requiring a network connection between the point-of-sale device and a remote server computer during the transaction.

* * * * *

UNITED STATES PATENT AND TRADEMARK OFFICE
CERTIFICATE OF CORRECTION

PATENT NO.        : 8,490,870 B2  
APPLICATION NO.   : 12/906375  
DATED             : July 23, 2013  
INVENTOR(S)       : Bacastow It is certified that error appears in the above-identified patent and that said Letters Patent is hereby corrected as shown below:

In the Specifications

In Column 1, Line 64, delete "(eg." and insert -- (e.g. --, therefor.

In Column 1, Line 66, delete "(eg." and insert -- (e.g. --, therefor.

In Column 4, Line 54, delete "[FIG." and insert -- [FIG. 1: --, therefor.

In Column 6, Line 3, delete "signature for pin-based)" and insert -- signature /or pin-based) --, therefor.

Signed and Sealed this  
Eighteenth Day of March, 2014

Michelle K. Lee  
*Deputy Director of the United States Patent and Trademark Office*